United States Patent [19]
Peet, II

[11] Patent Number: 5,033,402
[45] Date of Patent: Jul. 23, 1991

[54] METRIC/ENGLISH OROMETER

[75] Inventor: William J. Peet, II, West Allenhurst, N.J.

[73] Assignee: Peet Bros. Company, Inc., West Allenhurst, N.J.

[21] Appl. No.: 397,763

[22] Filed: Aug. 23, 1989

[51] Int. Cl.5 .......................................... G01D 13/10
[52] U.S. Cl. .................................. 116/292; 116/334; 116/DIG. 47
[58] Field of Search ....... 116/271, 292, 334, DIG. 46, 116/DIG. 47, DIG. 43; 73/384, 387

[56] References Cited

U.S. PATENT DOCUMENTS

| | | | |
|---|---|---|---|
| 1,351,130 | 8/1920 | Roesch | 116/271 X |
| 2,612,132 | 9/1952 | Triplett | 116/DIG. 46 |
| 3,978,730 | 9/1976 | Anderson | 73/387 |
| 4,055,141 | 10/1977 | Homs | 116/292 |
| 4,108,103 | 8/1978 | Ammar | 116/DIG. 47 |

Primary Examiner—William A. Cuchlinski, Jr.
Assistant Examiner—W. Morris Worth
Attorney, Agent, or Firm—Robert M. Skolnik

[57] ABSTRACT

Instruments are readable in either feet or meters by printing a metric altitude scale on the inner surface of a rotating protective crystal that shields the English altitude scale and the indicating needle. The metric altitude scale covers 1,000 meters and extends 33.7° beyond a full circle. A series of kilometer index marks is formed at intervals of 33.7° on the face of a bezel which surrounds the English scale. To use the metric scale, the user holds the bezel to align the index arrow line with the appropriate kilometer index mark, according to the user's elevation. Subsequently, if the needle moves beyond either limit of the metric scale, it is only necessary to rotate the crystal 33.7° in the appropriate direction, thereby aligning the "0" meter line with the adjacent index mark.

8 Claims, 3 Drawing Sheets

METRIC/ENGLISH OROMETER

FIELD OF THE INVENTION

This invention relates to orometers or other mechanical instruments in which the angular position of a rotating needle indicates the instrument reading on a concentric dial scale marked with suitable indicia and in which each complete revolution of said needle indicates only a portion of the total range of the instrument. Specifically, my invention provides a capability for the needle position on such an instrument to be interpreted directly in two units of measurement, such as feet and meters, by incorporation of a second dial scale, adjustable relative to the first.

DESCRIPTION OF THE PRIOR ART

A mechanical aneroid barometer is an instrument that utilizes a hollow springy metal capsule to sense changes in ambient air pressure. Ambient air pressure acts upon the sides of the capsule, pushing them inward as ambient pressure increases and allowing them to spring outward as it decreases. One side of the capsule is mechanically linked to a rotating needle. Atmospheric pressure is indicated by the angular position of the needle on a fixed concentric pressure scale.

An orometer is such a mechanical aneroid barometer to which is added a concentric altitude scale. In modern orometers provision is made to rotate the altitude scale to adjust the altitude reading for existing weather conditions.

Many orometers display their full measurement range within one revolution of the needle. It is apparent that such instruments can be provided with more than one scale, each with appropriate indicia, so the needle position can be interpreted in more that one unit of measurement. Thus, an orometer employing one needle revolution can readily be provided with one scale graduated in feet and a second concentric scale graduated in meters.

In certain high quality orometers, resolution is enhanced by designing the mechanical linkage between capsule and needle so the needle rotates as many as 9 times to display the full operating range of the instrument. It is customary to design such instruments so angular needle movement is linear in units of measurement and each revolution of the needle exactly represents some convenient whole number of measurement units (e/g/ 3,000 feet in English instruments, and 1,000 meters in metric instruments). Through such design a single set of scale graduation marks serves for all revolutions of the needle.

Some provision is usually made to facilitate reading such instruments after the first revolution of the needle. If the needle is to complete more that one revolution but not more that two, the graduation marks are often labeled with a separate set of numerals for the needle's second revolution. If the needle is to rotate more than two times, the instrument is usually provided with a counter wheel geared to the needle shaft and graduated in altitude increments corresponding to whole revolutions of the needle, e.g. 0, 3,000, 6,000, 9,000 feet or 0, 1,000, 2,000, 3,000 meters. Indicated altitude is the sum of the reading on said counter wheel plus the needle reading on the 3,000 foot (or 1,000 meter) altitude scale.

Commercially available instruments embodying the above designs are Models 84 and 88 from Peet Bros. Company, Inc., of West Allenhurst, N.J., and Models TX-12 and TX-18 manufactured by Revue Thommen AG of Waldenburg, Switzerland.

Until now, it has not been practical to include both a metric and an English altitude scale on an orometer in which the needle is designed to rotate more than two times. Each complete revolution of the needle would not represent a convenient whole number of units in the secondary measurement system, so a separate set of concentric indicia would be required for each revolution of the needle. Space limitations on the dial face of existing instruments make such a design impractical. Moreover, the visual complexity of such a design would be unacceptable to users.

SUMMARY OF THE INVENTION

In accordance with my invention, instruments of the class described can be read in both feet and meters. This is accomplished by printing a secondary altitude scale on the under surface of protective crystal, which must be retained in such a way that in can be rotated relative to the existing English scale. Such mounting of the protective crystal is utilized in the cited commercially available orometers manufactured by Revue Thommen AG.

The preferred embodiment of my invention utilizes an instrument basically calibrated in English units, with each revolution of the needle representing 3,000 feet. An additional concentric metric scale covering 1000 meters is printed on the under surface of the protective crystal. The added 1,000 meter scale extends beyond 360° to the extent that 1,000 meters exceed 3,000 feet—approximately 9.36% or 33.7°. It will be understood that the actual angle of offset is 33.7007874016°. Accordingly for the purpose of convenient explanation herein, "33.7°" is used. A series of kilometer index marks are formed at intervals of 33.7° upon the 3,000 foot scale, or, preferably, upon some convenient surface that is fixed in relation to that scale, such as the face of the surrounding bezel. Each kilometer index mark is numerically labeled in metric altitude increments corresponding to whole revolutions of the needle, e.g. −1 KM, 0 KM, 1 KM, 3 KM, etc. The "0" kilometer index mark is aligned with "0" altitude on the 3,000 foot English scale. The "−1 KM" index mark is offset therefrom by 33.7° in a counter-clockwise direction. The other kilometer index marks are offset from the "0 KM" in a clockwise direction by successive 33.7° increments.

To use the metric scale, the user first aligns zero on the 1,000 meter scale with the kilometer index mark closest to but lower than, the user's present elevation. This alignment is accomplished by holding the bezel firmly (thereby also securing the 3,000 foot altitude scale) and rotating the protective crystal within it. Following this alignment, altitude in meters is indicated as the sum of the altitude label on said kilometer index mark plus the needle reading on the 1,000 meter altitude scale.

The user then adjusts the orometer for existing weather conditions by rotating the bezel so the instrument correctly displays present altitude.

Orometers and electronic aneroid altimeters are commonly used with topographic maps for orientation and navigation. Topographic maps of the United States are being converted from English to metric units. However, the conversion is progressing rather slowly. Some topographic maps are being reissued in metric units whereas contiguous maps are only available in English units. This condition of a mixed English/metric mapping system strongly favors use of electronic aneroid altimeters that can display altitude in both English and metric units, as opposed to high resolution orometers that, prior to my invention, have been able to display altitude in only one measurement system.

A principal object of my invention is the provision of a high resolution orometer which is readable in both English and metric units.

Another object of my invention is the provision of metric and English readable scales in a high resolution mechanical instrument.

An important object of my invention is the provision of a dual scale high resolution mechanical instrument.

A still further object of my invention is the provision of a dual metric/English altitude scale for a mechanical altimeter/barometer.

BRIEF DESCRIPTION OF THE DRAWINGS

These as well as further objects and advantages of the invention will become apparent to those skilled in the art from a review of the following detailed specification of my invention reference being made to the accompanying drawings in which.

DETAILED DESCRIPTION OF THE INVENTION

Figure 1:
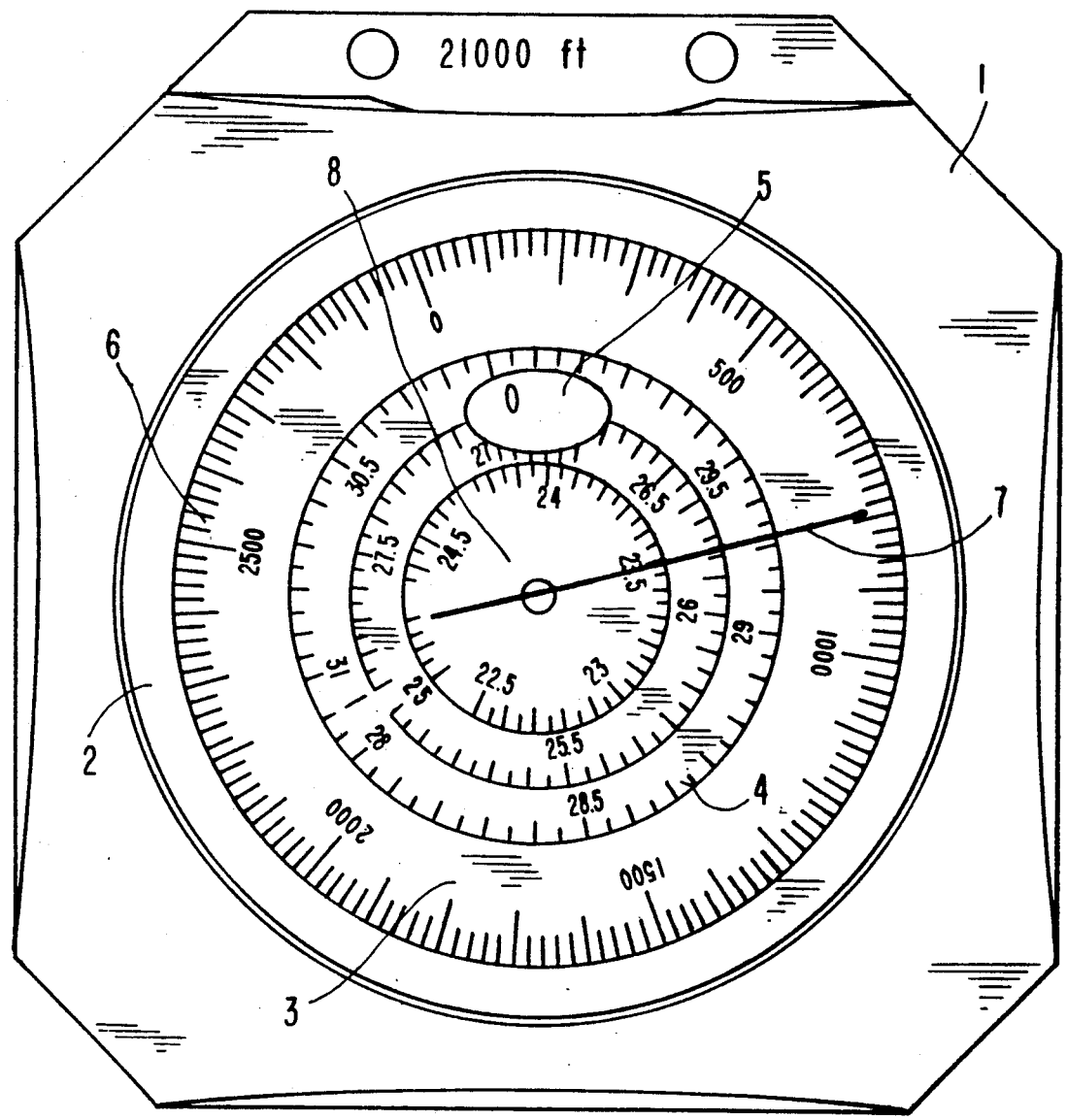
FIG. 1 is a plan view of the face of a high resolution orometer employing an English altitude scale.

FIG. 1 is a plan view of the display face of a commercially available high resolution orometer, manufactured as Model TX-18 by Revue Thommen, AG, Waldenburg, Switzerland. The case of the instrument is designated by reference numeral 1. The instrument includes a pointer needle 7 which rotates about the axis of needle shaft 8. Needle 7 completes eight revolutions over the entire measurement range of the instrument. A scale 4 consists of three concentric sets of indicia, fixed in relation to the case 1, and formed in units of inches of mercury ("inHg") to indicate barometric pressure from "22.5-31" in increments of "0.05 inHg". An altitude scale 6 is calibrated from "0" to "3000" feet in increments of 20 feet. Scale 6 is secured to a rotatable bezel 2 that surrounds the display face. Bezel 2 also retains a protective crystal cover 3 that can be rotated independently within the bezel. A counter wheel 5 displays the number of full scale revolutions of needle 7 so that a full range of −1,000 to 21,000 feet may be indicated by this instrument.

When the instrument senses a change in ambient air pressure, pointer needle 7 rotates about the axis of needle shaft 8.

Figure 2:
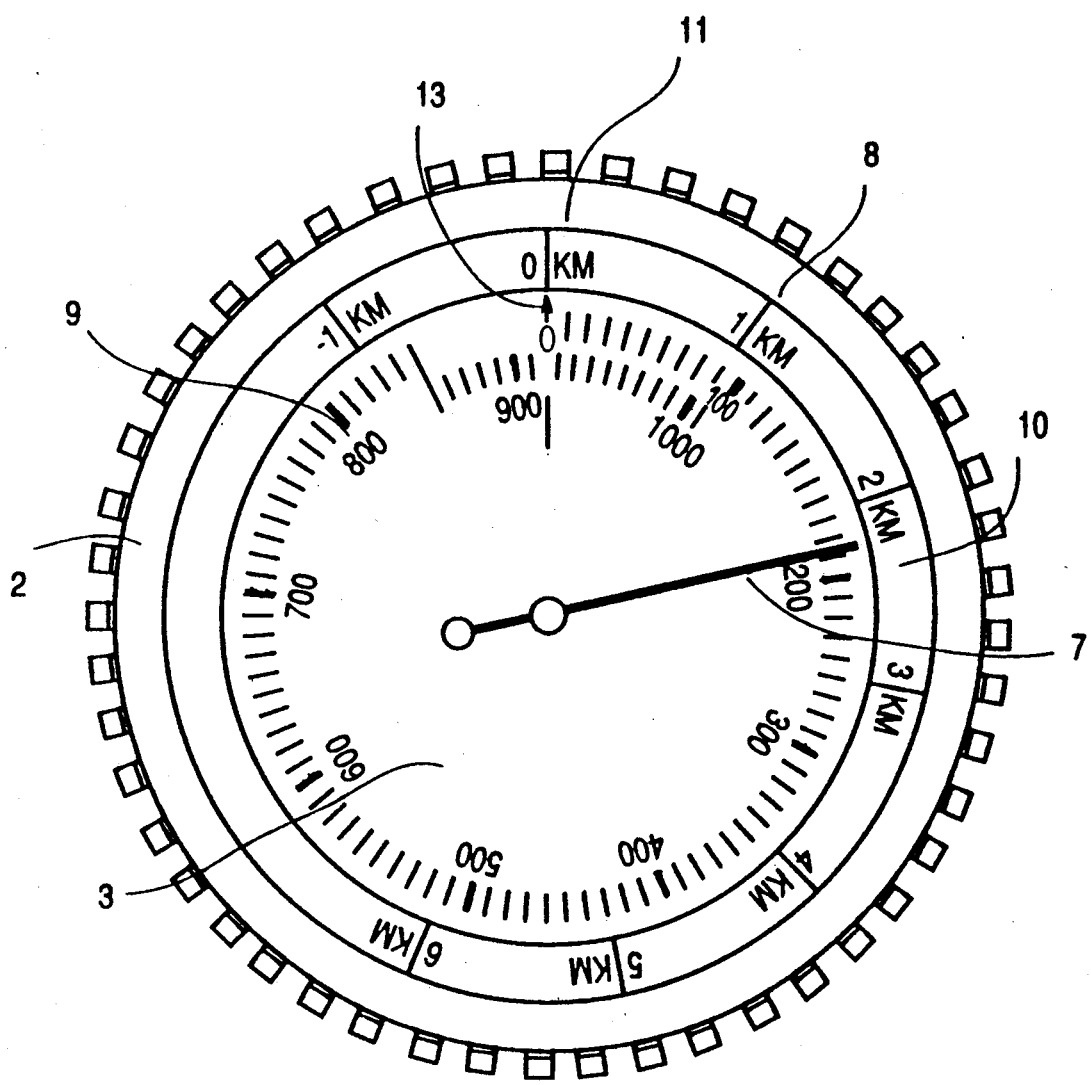
FIG. 2 is a plan view of the metric altitude scale and kilometer index marks used in my invention.

FIG. 2 is a plan view of the metric scale modification to be incorporated in the instrument of FIG. 1. In FIG. 2, numeral 3 denotes the protective crystal, described in connection with FIG. 1, which can be rotated within the bezel 2. In my invention, a metric scale 9 is formed on the underside of protective crystal 3 and is calibrated in units of "10 m". Scale 9 ranges from "0-1,000" meters and extends 33.7° beyond a full circle. A kilometer index arrow 13 is formed in alignment with the 0 kilometer altitude graduation mark. Kilometer index marks are imprinted on the visible portion 10 of bezel 2 at intervals of 33.7° and labeled "−1 KM", "0 KM" (11), "1 KM" (8), etc., through "6 KM", which is sufficient in number to accommodate the multiple revolutions of pointer needle 7 over the full range of the instrument of FIG. 1. The kilometer index marks are aligned such that when the index arrow 13 is aligned with the "0 KM" index mark, "0" on the metric scale will be aligned with "0" on the English scale.

To use the metric scale, the user rotates the protective crystal to align kilometer index arrow 13 with the appropriate kilometer index mark, according to his starting altitude. Subsequently, if the needle moves beyond either limit of the metric scale, it is only necessary to rotate the glass 33.7° in the appropriate direction, thereby aligning the kilometer index arrow with the adjacent kilometer index mark.

Figure 3:
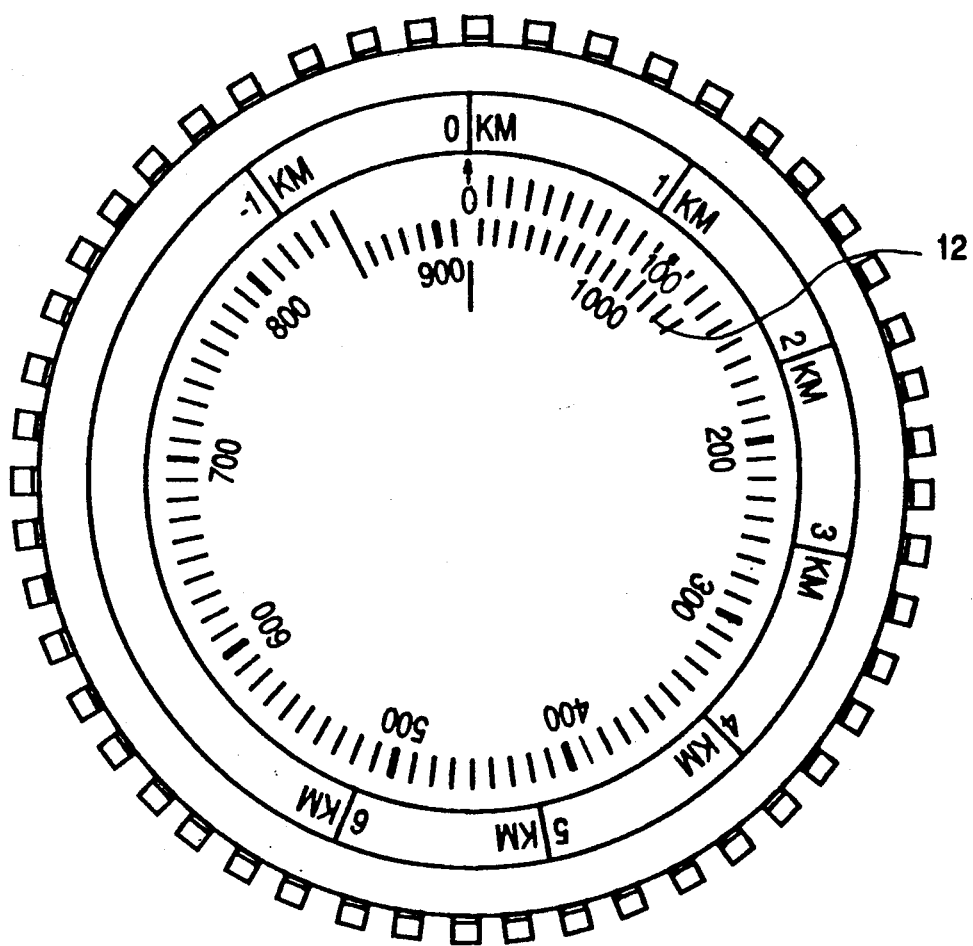
FIG. 3 is a plan view of FIG. 2 in which four extra ten meter graduation marks have been added thereby extending the range of the 1,000 meter scale to 1040 meters.

FIG. 3 is the same plan view as FIG. 2 with four ten meter graduation marks 12 included above the 1,000 meter line. This provides the 1,000 meter scale with some overlap to avoid the necessity of frequently realigning it when traveling along or close to an even kilometer contour line.

It will be understood that the metric scale 9 and the kilometer reference marks imprinted on bezel 2 may take the form of a measurement system which consists of numerals indicating the number of needle rotations. In this construction, the user performs the conversion mentally or through the use of a conversion table.

The metric scale 9 and the kilometer reference marks imprinted on bezel 2 should preferably be printed in a color which contrasts with the color used for scale 6.

In FIGS. 2 and 3, a plurality of teeth are formed about the periphery of the bezel 2 to enable the bezel to be grasped and rotated in the housing 1 by the user.

As other modifications to the foregoing may be made without departing from the spirit and scope of my invention, what is sought to be protected is set forth in the appended claims.

I claim:

1. In a display including a case, a rotatable bezel mounted on said case, a crystal rotatably mounted on said bezel, a moveable pointer mounted in said case, a plurality of display elements including a first scale in a first system of measurement mounted in said case and secured to said bezel adjacent said moveable pointer, and a second scale including a plurality of indicia mounted in said case, said second scale having means responsive to movement of said pointer for moving said second scale, reference means mounted in said case for cooperating with said second scale to indicate the number of times said moveable pointer traverses said first scale, the improvement comprising: a third scale having indicia in a second system of measurement formed on said crystal overlying said first scale and said moveable pointer at a location for representing the mathematical conversion of said first system of measurement to said second system of measurement; and a fourth scale including a series of index marks in said second system of measurement formed on said bezel adjacent to said third scale, said index marks corresponding to the number of times said moveable pointer traverses said third scale, said third scale being alignable with said fourth scale so as to convert the reading of said first and second scales to the second system of measurement.

2. The display of claim 1 wherein said first and third scales are indicative of altitude.

3. The display of claim 2 wherein said first system is the English system and said second system is the metric system.

4. In a display including a case, a rotatable bezel mounted on said case, a crystal rotatably mounted on said bezel, a moveable pointer means mounted in said case, a first scale in a first system of measurement mounted in said case and secured to said bezel, and a second scale including a plurality of indicia mounted in said case, said second scale having means responsive to movement of said pointer for moving said second scale, reference means mounted in said case for cooperating with said second scale to indicate the number of times said moveable pointer traverses said first scale, the improvement comprising: third scale means having indicia in a second system of measurement formed on said crystal at a location relative to said first scale and said pointer for representing the mathematical conversion of said first system of measurement to said second system of measurement; and fourth scale means including a series of index marks formed on said bezel in said second system of measurement rotatably surrounding said third scale means, said index marks corresponding to the number of times said moveable pointer traverses said third scale means, said third scale being alignable with said fourth scale so as to convert the reading of said first and second scales to the second system of measurement.

5. The display of claim 4 wherein said first and third scales are indicative of altitude.

6. The display of claim 5 wherein said first system is the English system and said second system is the metric system.

7. In a display including a case, a rotatable bezel mounted on said case, a crystal rotatably mounted on said bezel, an indicating needle mounted in said case, a first concentric scale mounted in said case and secured to said bezel having indicia indicating altitude in a first system of measurement, and second scale means mounted in said case responsive to movement of said needle for moving said second scale means, reference means cooperating with said second scale means to indicate how many revolutions over said first scale said indicating needle has made, the improvement comprising: second concentric scale means for indicating altitude said second concentric scale means having a first portion mounted on said crystal and a second portion formed on said bezel, said first and second portions having indicia in a second system of measurement, said second portion of said second concentric scale means including index marks corresponding to the number of times said moveable needle traverses said first portion of said second concentric scale means such that, within each revolution of said indicating needle, said portions of said second concentric scale means can be properly aligned to permit the angular position of the indicating needle to be correctly interpreted in units of said second measurement system.

8. The display of claim 7 wherein one measuring system is the English system and the other measuring system is the metric system.

* * * * *